(12) United States Patent
Wigren et al.

(10) Patent No.: US 11,418,974 B2
(45) Date of Patent: Aug. 16, 2022

(54) EFFICIENT BEAM SEARCHING

(71) Applicant: Telefonaktiebolaget LM Ericsson (publ), Stockholm (SE)

(72) Inventors: Torbjörn Wigren, Uppsala (SE); Ramon Delgado, Elermore Vale (AU); Robert Karlsson, Sundbyberg (SE); Katrina Lau, Wallsend (AU); Richard Middleton, North Lambton (AU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 126 days.

(21) Appl. No.: 16/760,582

(22) PCT Filed: Nov. 1, 2017

(86) PCT No.: PCT/SE2017/051080
§ 371 (c)(1),
(2) Date: Apr. 30, 2020

(87) PCT Pub. No.: WO2019/088888
PCT Pub. Date: May 9, 2019

(65) Prior Publication Data
US 2020/0351672 A1   Nov. 5, 2020

(51) Int. Cl.
*H04W 16/28* (2009.01)
*G06N 7/00* (2006.01)
*H04W 72/04* (2009.01)

(52) U.S. Cl.
CPC ............ *H04W 16/28* (2013.01); *G06N 7/005* (2013.01); *H04W 72/046* (2013.01)

(58) Field of Classification Search
CPC ..... H04W 16/28; H04W 72/046; G06N 7/005
(Continued)

(56) References Cited

U.S. PATENT DOCUMENTS

2019/0097712 A1*  3/2019  Singh ................. H04B 7/04

FOREIGN PATENT DOCUMENTS

KR   10-2016-0148032 A   12/2016
WO       2015/183472 A1  12/2015
(Continued)

OTHER PUBLICATIONS

International Search Report and Written Opinion dated Jul. 16, 2018 issued in International Application No. PCT/SE2017/051080. (13 pages).

(Continued)

*Primary Examiner* — Obaidul Huq
(74) *Attorney, Agent, or Firm* — Rothwell, Figg, Ernst & Manbeck, P.C.

(57) ABSTRACT

A method for generating a probability map for a cell served by a network node is provided. The method includes generating a first probability map (P1) indicating a likelihood of primary beam directions (step 602). Generating the first probability map includes recording a first direction of a first user equipment (UE), the first direction indicating a direction of a first beam (e.g., a first set of antenna weights (a.k.a., precoding vector)) associated with the first UE when the first UE appears in the cell served by the network node. The method further includes generating a second probability map (P2) indicating a joint likelihood of primary and secondary beam directions (step 604). Generating the second probability map includes recording a second direction of a second beam associated with the first UE when the first UE switches from the first beam to the second beam, the second direction being recorded in association with the first direction.

19 Claims, 10 Drawing Sheets

(58) Field of Classification Search
USPC .................................. 370/310, 328, 329
See application file for complete search history.

(56) References Cited

FOREIGN PATENT DOCUMENTS

| WO | 2016/129744 A1 | 8/2016 |
| WO | 2017/184190 A1 | 10/2017 |

OTHER PUBLICATIONS

Ericsson, "On UE initiated beam recovery", 3GPP TSG-RAN WG1 #87ah-NR, R1-1700765, Spokane, WA, USA Jan. 16-20, 2017 (2 pages).
Intel Corporation, "Discussion on Beam Management", 3GPP TSG-RAN WG1 Meeting NR#3, R1-1716294, Nagoya, Japan, Sep. 18-21, 2017 (8 pages).

* cited by examiner

EFFICIENT BEAM SEARCHING

CROSS REFERENCE TO RELATED APPLICATION(S)

This application is a 35 U.S.C. § 371 National Stage of International Patent Application No. PCT/SE2017/051080, filed Nov. 1, 2017, designating the United States.

TECHNICAL FIELD

Disclosed are embodiments related to beam searching.

BACKGROUND

In the emerging 5G cellular systems, beamforming and MIMO transmission will be central technologies. The reason is that spectral resources are running out at low carrier frequencies which leads to a gradual migration into higher frequency bands, like the millimeter-wave ("mmw") band. There, beamforming and a use of massive antenna arrays are needed to achieve a sufficient coverage. There is, for example, plenty of available spectrum around 28 GHz and 39 GHz in the US and other markets. This spectrum needs to be exploited to meet the increasing capacity requirements. The 5G frequency migration is expected to start at 3.5-5 GHz, and then continue to these 28 GHz and 39 GHz bands that are expected to become available in the not-too-distant future.

In the following description, 3GPP terminology for the 4G LTE system is used (unless otherwise noted), since the standardization of the 5G counterparts are not yet finalized.

Beamforming and MIMO transmission is a mature subject today. This section presents the basics.

To explain the beamforming concept, consider FIG. 1, which shows an idealized, one-dimensional beamforming case. In system 100, if it is assumed that the UE 102 is located far away from the antenna array 104 (e.g., found at a base station (BS)), then it follows that the difference in travel distance from the base station to the UE, between adjacent antenna elements, is $1=k\lambda \cdot \sin(\theta)$, where $k\lambda$ is the antenna element separation. Here k is the separation factor, which may for example be 0.5-0.7 in a typical correlated antenna element arrangement. This means that if a reference signal $s_i e^{-j\omega t}$ is transmitted from the i-th antenna element, it will arrive at the user equipment (UE) antenna as a weighted sum:

$$s_{UE} = \sum_{i=0}^{N-1} s_i h_i e^{j\omega\left(t-\frac{il}{c}\right)} =$$

$$e^{j\omega t} \sum_{i=0}^{N-1} s_i h_i e^{-j2\pi f_c \frac{ik\lambda \sin\theta}{f_c \lambda}} = e^{j\omega t} \sum_{i=0}^{N-1} s_i h_i e^{-j2\pi ik\sin\theta}.$$

Here $\omega$ is the angular carrier frequency; $h_i$ is the complex channel from the i-th antenna element; t is the time; and $f_c$ is the carrier frequency. In the above equation $\theta$ and $h_i$ are unknown. In case of a feedback solution, the UE therefore needs to search for all complex channel coefficients $h_i$ and the unknown angle $\theta$. For this reason, the standard defines a codebook of beams in different directions given by steering vector coefficients like $w_{m,i} = e^{-jf(m,i)}$, where m indicates a directional codebook entry, and where f( ) denotes a function. The UE then tests each codebook and estimates the channel coefficients. The information rate achieved for each codebook entry m is computed, and the best one defines the direction and channel coefficients. This is possible since $s_i$ is known. The result is then encoded and reported back to the base station. This provides the base station with a best direction (codebook entry) and information that allows it to build up a channel matrix H. This matrix represents the channel from each of the transmit antenna elements to each of the receive antenna elements. Typically, each element of H is represented by a complex number.

The channel matrix can then be used for beamforming computations, or the direction represented by the reported codebook entry can be used directly. In case of MIMO transmission, the MIMO beamforming weight matrix W needs to be determined, so that a best match, e.g. to the condition WH=I is achieved. I denotes the identity matrix. In case of an exact match, each layer will become independent of other layers. This concept can be applied for single users or multiple users.

Channel State Information (CSI) reference signals (CSI-RS) has been available since release 11 in LTE. These signals (i.e., the CSI-RS) support beamforming. CSI-RS are assigned to a specific antenna port. CSI-RS may be transmitted to the whole cell or may be beamformed in a UE-specific manner. In 3GPP, since release 13, two classes of CSI-RS reporting modes have been introduced: a class A CSI-RS mode uses fixed-beam codebook-based beamforming, while a class B CSI-RS mode may send beamformed CSI-RS in any manner.

A CSI-RS process in a UE comprises detection of selected CSI-RS signals, measuring interference and noise on CSI Interference Measurement (IM) (CSI-IM), and reporting of the related CSI information, in terms of CQI, RI, and PMI. A UE may report more than one set of CQI, RI, and PMI, i.e. information for more than one codebook entry. Since release 11, up to 4 CSI-RS processes can be set up for each UE.

The codebook of the 3GPP standard is defined to represent certain directions. In release 13, directions in both azimuth and elevation is defined, thereby allowing 2D beamforming to be used. These 4G codebooks are specified in detail in 3GPP TR 36.897. A similar definition, but with finer granularity is expected for the 3GPP 5G standard.

To illustrate that the codebooks indeed define specific directions, it can be noted that the formula for the azimuth codebook is $$w_k = \frac{1}{\sqrt{K}} \exp\left(-j\frac{2\pi}{\lambda}(k-1)d_v \cos\theta_{etilt}\right),$$

for k=1, . . . , K. It has the same structure as discussed above. Similarly, the vertical codebook is given by $$v_{1,i} = \frac{1}{\sqrt{L}} \exp\left(-j\frac{2\pi}{\lambda}(l-1)d_H \sin\vartheta_i\right),$$

for l=1, . . . , L. Further details of these equations may be found in the specification document 3GPP TR 36.897.

A 2D beam is obtained by a multiplication of the two above equations (i.e. equations for azimuth and vertical codebooks).

Releases 11 and 12 both support 4 CSI-RS processes per UE. In these releases, however, only one-dimensional codebooks, corresponding to 8 antenna ports, are supported, as compared for the support of 2D codebooks for 16 ports in release 13.

Given two nodes equipped with antenna arrays that communicate in a single frequency band, the channel reciprocity property means that at any given point in time, the complex channel coefficient between any transmitting antenna element in one node and any receiving antenna element in the other node, is the same in the uplink and the downlink (up to conjugate transpose). Channel reciprocity is a consequence of Maxwell's Equations. The channel matrix therefore remains the same (except for a conjugate transpose representing the change of direction) between the antenna arrays of the two nodes when the direction of the transmission is reversed. The two nodes may typically be a UE and an eNB, or in 5G a UE and a gNB, where gNB is the commonly accepted acronym for a 5G base station. The time is assumed to be essentially the same for the two directions of transmission.

To exploit reciprocity, the channel coefficients can be directly estimated by the base station from UE uplink transmission of known pilot signals, for example so-called sounding reference signals (SRSs). The estimated channel can then be used to compute the combining weight matrix with a selected principle, and then used for downlink transmission. This works since the uplink and downlink channels are the same (except for a conjugate transpose) when reciprocity is valid.

However, an important restriction is that the locations of the antenna arrays and the rest of the radio environment remains the same during the time reciprocity-based transmission is applied. This restriction, for example, does not necessarily hold in the case of UE motion (mobility). As a rule of thumb, the channel de-correlates for UE movement of about 0.4 wavelengths. This means that for a given UE mobility, the higher the carrier frequency, the less is the duration of time during which reciprocity holds. After de-correlation, new SRS measurements are needed and a renewed beamforming solution needs to be computed.

The dominating multi-user access technology for 5G is expected to become some variant of orthogonal frequency division multiple access (OFDMA). As is well known, this access is associated with a resource grid, divided in time and frequency, as shown in FIG. 2. The resource grid provides a division in frequency defined by sub-carriers and a division in time by OFDM symbols. The product set of a subcarrier and an OFDM symbol forms a resource element and as in LTE, a time-frequency block of resource elements forms a resource block. The currently evolving 3GPP NR 5G standard recently also defined slots and mini-slots, giving additional addressing modes of time-frequency resources. When multi-layered (e.g., MIMO) transmission is used, there is one overlaid resource grid per layer, separated by spatial pre-coding.

Beamforming implies transmitting the same signal from multiple antenna elements of an antenna array with an amplitude and/or phase shift applied to the signal for each antenna element. These amplitude/phase shifts are commonly denoted as the antenna weights and the collection of the antenna weights for each of the antennas is a precoding vector.

Different precoding vectors give rise to a beamforming of the transmitted signal and the weights can be controlled so that the signals are coherently combining in a certain angle direction as seen from the antenna array in which case it is said that a transmit (Tx) beam is formed in that direction. Hence, in some contexts, when we refer to a beam we are referring to a particular precoding vector (a.k.a., "beamforming weights"). If the antennas of the array are placed in two dimensions, i.e. in a plane, then the beam can be steered in both azimuth and elevation directions with respect to the plane perpendicular to the antenna array.

SUMMARY

When a new user equipment (UE) enters a mmw wireless system, it is very often required to find an initial beam, with a direction that points to and/or from the UE. Prior art solutions to this include scanning blindly all possible directions, or using spatial techniques (e.g. Fast Fourier Transform (FFT) techniques) to simultaneously search in all beam directions of the antenna array. There are drawbacks with both searching approaches (i.e. with scanning and with simultaneous search approaches).

For the first approach (scanning), the most pronounced and obvious drawback is the long latency associated with scanning all beam directions, one beam direction at a time. For the second approach (simultaneous search, e.g. using FFT techniques), a drawback is that it results in decreased sensitivity. This is because, for example, the second approach requires a search and detection based on the signal power or signal-to-noise ratio (SNR) for each direction, which to avoid false alarms requires larger thresholds as the dimension of the beamspace increases. The dimension of the beamspace is roughly equal to the number of beams, which in turn is approximately equal to the number of antenna array elements.

Embodiments improve either approach, for example, by providing for: (1) reduced scanning latency, e.g. where scanning is employed to detect beams of users (e.g., when an active antenna system (AAS) is used); and (2) increased sensitivity of beam detection, e.g. where such beam detection is based on instantaneous direction finding Fast Fourier Transform (FFT) methods (e.g., by enabling the use of tighter thresholds).

One observation is that where it is known, for a given base station (e.g., eNB, gNB) of a cell, that UEs most often occur in a subset of the beamspace, then both problems above with prior art approaches can be addressed, resulting in improved performance. For example, where the first approach (scanning) is used, and a subset of the beamspace where UEs are most often found is known, then the average scanning latency could be reduced if more time is spent searching in the more likely directions and less time is spent searching in the less likely directions. Likewise, where the second approach (simultaneous search) is used, such a search of a subset of the beamspace (as compared to the whole beamspace) would enable increasing the sensitivity of the detection algorithm (e.g., because the required SNR and/or SINR for detection of a beam of a user may be reduced). The reason that the required SNR and/or SINR for detection of a beam of a user may be reduced is e.g. that a reduced number of possibilities for finding the UE means that the size of the search space is reduced, and therefore the likelihood of an erroneous detected direction because of a random fluctuation is also reduced, which means that the SNR and/or SINR can be higher, which may result in increased coverage.

Another observation is that where a main (a.k.a. primary) beam of a UE is already being tracked, it can be important for the general beam tracking functionality to also find and track secondary (a.k.a. candidate) beams. At mmw frequencies this has the advantage that a sudden disappearance of a main beam would not lead to a dropped connection, since communication could then continue over secondary beams. At mmw frequencies, beam quality may fall extremely rapidly e.g., when obstacles appear or when users go around corners. This fact makes tracking of secondary beams increasingly important for high carrier frequencies (such as mmw frequencies). The advantages noted above (and elsewhere) for the initial search for a primary beam also apply to the initial search for secondary beams.

Embodiments provide for building a first probability map indicating likelihood of primary beam directions. For example, the first probability map may include the coverage region of the cell, e.g. in two or three dimensions, and may indicate the likelihood that a first beam of a new UE is detected in a specific angular direction (e.g., azimuth only; both azimuth and elevation; and/or azimuth, elevation and path gain) and/or distance and/or position.

Embodiments provide for building a second probability map indicating a joint likelihood of primary and secondary beam directions. For example, the second probability map may include the coverage region of the cell, e.g. in two or three dimensions, and may indicate the likelihood that a secondary beam is detected in a specific angular (e.g., azimuth only; both azimuth and elevation; and/or azimuth, elevation and path gain) and/or distance and/or position, conditioned on the currently estimated angular direction and/or distance and/or position of a first beam.

Embodiments may make use of one or more of the first and second probability maps in the search (e.g., based on scanning and/or simultaneous searching) for beams of new UEs and also in the search for secondary beams of UEs associated with a first beam.

According to a first aspect, a method for generating a probability map for a cell served by a network node is provided. The method includes generating a first probability map (P1) indicating a likelihood of primary beam directions. Generating the first probability map includes recording a first direction of a first user equipment (UE), the first direction indicating a direction of a first beam (e.g., a first set of antenna weights (a.k.a., precoding vector)) associated with the first UE when the first UE appears in the cell served by the network node. The method further includes generating a second probability map (P2) indicating a joint likelihood of primary and secondary beam directions. Generating the second probability map includes recording a second direction of a second beam associated with the first UE when the first UE switches from the first beam to the second beam, the second direction being recorded in association with the first direction.

In some embodiments, the method further includes receiving a first indication when a second UE appears in the cell served by the network node, the first indication including a third direction indicating a direction of a third beam associated with the second UE when the second UE appears in the cell served by the network node; and upon receiving the first indication, updating the first probability map. Updating the first probability map includes recording the third direction of the second UE. In embodiments, the method further includes receiving a second indication when the second UE switches from the third beam to a fourth beam, the second indication comprising a fourth direction indicating a direction of the fourth beam associated with the second UE; and upon receiving the second indication, updating the second probability map. Updating the second probability map includes recording the fourth direction of the second UE, the fourth direction being recorded in association with the third direction.

In some embodiments, receiving one or more of the first indication and the second indication includes tracking, by the network node, of the second UE in the cell served by the network node. In embodiments, receiving one or more of the first indication and the second indication comprises receiving, from the network node, information about the second UE in the cell served by the network node. In embodiments, the method further includes updating, periodically or event based, one or more of the first probability map and the second probability map, to include direction information about UEs located within the cell served by the network node. In embodiments, the method further includes transmitting one or more of the first probability map and the second probability map to the network node.

In some embodiments, the method further includes searching a beamspace to determine an initial beam (e.g., a first set of antenna weights (a.k.a., precoding vector)) for communication between a user equipment (UE) and the node. Searching the beamspace to determine the initial beam includes prioritizing directions ($\alpha_1$) within the beamspace based on the first probability map. In embodiments, the method further includes searching the beamspace to determine a backup beam (e.g., a second set of antenna weights (a.k.a., precoding vector)) for communication between the UE and the node. Searching the beamspace to determine the backup beam includes prioritizing directions ($\alpha_2$) within the beamspace based on the second probability map and the initial beam.

According to a second aspect, a method is provided. The method may be performed by a node in a network, the network node serving a cell; and/or the method may be performed by a user equipment (UE), the UE being in a cell served by a node in a network. The method includes receiving a first probability map (P1) indicating a likelihood of primary beam directions. The method further includes searching a beamspace to determine a first beam (e.g., a first set of antenna weights (a.k.a., precoding vector)) for communication between a user equipment (UE) and the node. Searching the beamspace to determine the first beam includes prioritizing directions ($\alpha_1$) within the beamspace based on the first probability map.

In some embodiments, the method further includes determining an orientation (e.g., of the UE with respect to the node). In embodiments, e.g. where a UE receives a probability map from another entity such as a base station, the orientation may be used to determine how angles or positions measured with respect to the base station are related to the UE. For example, a base station may determine that at an initial beam is most likely at an angle of approximately 15° (with respect to the base station), and the UE may then use knowledge of its orientation and knowledge of the base station, to determine a corresponding angle (with respect to the UE).

In some embodiments, searching the beamspace to determine the first beam further comprises searching only a first subset of the beamspace, the first subset comprising directions ($\alpha_1$) within the beamspace that exceed a first threshold ($th_1$) (e.g., $P1(\alpha_1) > th_1$). In embodiments, the method further includes receiving a second probability map (P2) indicating a joint likelihood of primary and secondary beam directions; and searching the beamspace to determine a second beam (e.g., a second set of antenna weights (a.k.a., precoding vector)) for communication between the UE and the node. Searching the beamspace to determine the second beam includes prioritizing directions ($\alpha_2$) within the beamspace based on the second probability map and the first beam. In embodiments, searching the beamspace to determine the second beam further comprises searching only a second subset of the beamspace, the second subset comprising directions ($\alpha_2$) within the beamspace that exceed a second threshold ($th_2$) (e.g., $P2(\alpha_2|\alpha_1) > th_2$). Here, | denotes statistical conditioning.

According to a third aspect, a method performed by a node in a network is provided. The method includes receiving one or more of (1) a first probability map (P1) indicating a likelihood of primary beam directions and (2) a second probability map (P2) indicating a joint likelihood of primary and secondary beam directions (step 802). The method further includes signaling to a user equipment (UE) the one or more of the first probability map and the second probability map (step 804).

According to a fourth aspect, a device for generating a probability map for a cell served by a network node is provided. The device is adapted to generate a first probability map (P1) indicating a likelihood of primary beam directions. Generating the first probability map includes recording a first direction of a first user equipment (UE), the first direction indicating a direction of a first beam (e.g., a first set of antenna weights (a.k.a., precoding vector)) associated with the first UE when the first UE appears in the cell served by the network node. The device is further adapted to generate a second probability map (P2) indicating a joint likelihood of primary and secondary beam directions. Generating the second probability map includes recording a second direction of a second beam associated with the first UE when the first UE switches from the first beam to the second beam, the second direction being recorded in association with the first direction.

According to a fifth aspect, a device is provided. The device may include a node in a network, the network node serving a cell; and/or a user equipment (UE), the UE being in a cell served by a node in a network. The device is adapted to receive a first probability map (P1) indicating a likelihood of primary beam directions. The device is further adapted to search a beamspace to determine a first beam (e.g., a first set of antenna weights (a.k.a., precoding vector)) for communication between a user equipment (UE) and the node. Searching the beamspace to determine the first beam includes prioritizing directions ($\alpha_1$) within the beamspace based on the first probability map.

According to a sixth aspect, a device is provided. The device may be a node in a network. The device is adapted to receive one or more of (1) a first probability map (P1) indicating a likelihood of primary beam directions and (2) a second probability map (P2) indicating a joint likelihood of primary and secondary beam directions (step 802). The device is further adapted to signal to a user equipment (UE) the one or more of the first probability map and the second probability map (step 804).

According to a seventh aspect, a device for generating a probability map for a cell served by a network node is provided. The device includes a generating module. The generating module is configured to generate a first probability map (P1) indicating a likelihood of primary beam directions. Generating the first probability map includes recording a first direction of a first user equipment (UE), the first direction indicating a direction of a first beam (e.g., a first set of antenna weights (a.k.a., precoding vector)) associated with the first UE when the first UE appears in the cell served by the network node. The generating module is further configured to generate a second probability map (P2) indicating a joint likelihood of primary and secondary beam directions. Generating the second probability map includes recording a second direction of a second beam associated with the first UE when the first UE switches from the first beam to the second beam, the second direction being recorded in association with the first direction.

According to an eighth aspect, a device for searching a beamspace is provided. The device includes a receiving module, a determining module, and a searching module. The receiving module is configured to receive a first probability map (P1) indicating a likelihood of primary beam directions. This probability map may be a map generated by generating module 902, or it may be map transmitted by another entity (such as another UE, node, and/or pooled processing environment). The determining module is configured to determine an orientation (e.g., of the UE, node, and/or pooled processing environment). The searching module is configured to search a beamspace to determine a first beam (e.g., a first set of antenna weights (a.k.a., precoding vector)) for communication between a user equipment (UE) and the node. Searching the beamspace to determine the first beam includes prioritizing directions ($\alpha_1$) within the beamspace based on the first probability map.

According to a ninth aspect, a device for signaling a probability map is provided. The device includes a receiving module and a signaling module. The receiving module is configured to receive one or more of (1) a first probability map (P1) indicating a likelihood of primary beam directions and (2) a second probability map (P2) indicating a joint likelihood of primary and secondary beam directions. The signaling module is configured to signal to a user equipment (UE) the one or more of the first probability map and the second probability map.

According to a tenth aspect, computer programs are provided. The computer programs include a computer program, comprising instructions which, when executed on at least one processor, causes the at least one processor to carry out the method according to any one of the first aspect, the second aspect, and the third aspect. According to an eleventh aspect, carriers are provided. The carriers include a carrier comprising any one of the disclosed computer programs of the tenth aspect, wherein the carrier is one of an electronic signal, optical signal, radio signal or computer readable storage medium.

BRIEF DESCRIPTION OF THE DRAWINGS

The accompanying drawings, which are incorporated herein and form part of the specification, illustrate various embodiments.

DETAILED DESCRIPTION

Embodiments make use of a node (e.g., a base station such as a gNB) being able to track beams in a cell. A beam may refer, for example, to a set of antenna weights (a.k.a., precoding vector). Tracking a particular beam, in this context, may refer to receiving signal measurements (such as signal power, signal strength, SINR) pertaining to a signal (e.g., a reference signal) that has been transmitted using a particular precoding vector. The signal measurement may indicate the power of the signal as measured by a UE. Such signal measurements may vary because of the geometry of the cell, e.g. due to beam reflections, beam diffraction, and/or beam shadowing effects. A base station may be able to measure signal measurements of beams within its own cell. For example, a UE within the cell may measure reference signal received power (RSRP) and/or reference signal strength indicator (RSSI), and may report such measurements, or other quality indicators, to the cell's base station. A base station may also be able to measure signal measurements of beams within neighboring cells. For example, neighboring base stations may report their own internal measurements to each other. Tracking a beam may depend on whether communication is in the uplink (from UE to BS) or downlink (from BS to DL); for example, in the uplink, the base station may be able to measure directly received power, while in the downlink, the base station may base such measurements on reports received from the UE.

Figure 1:
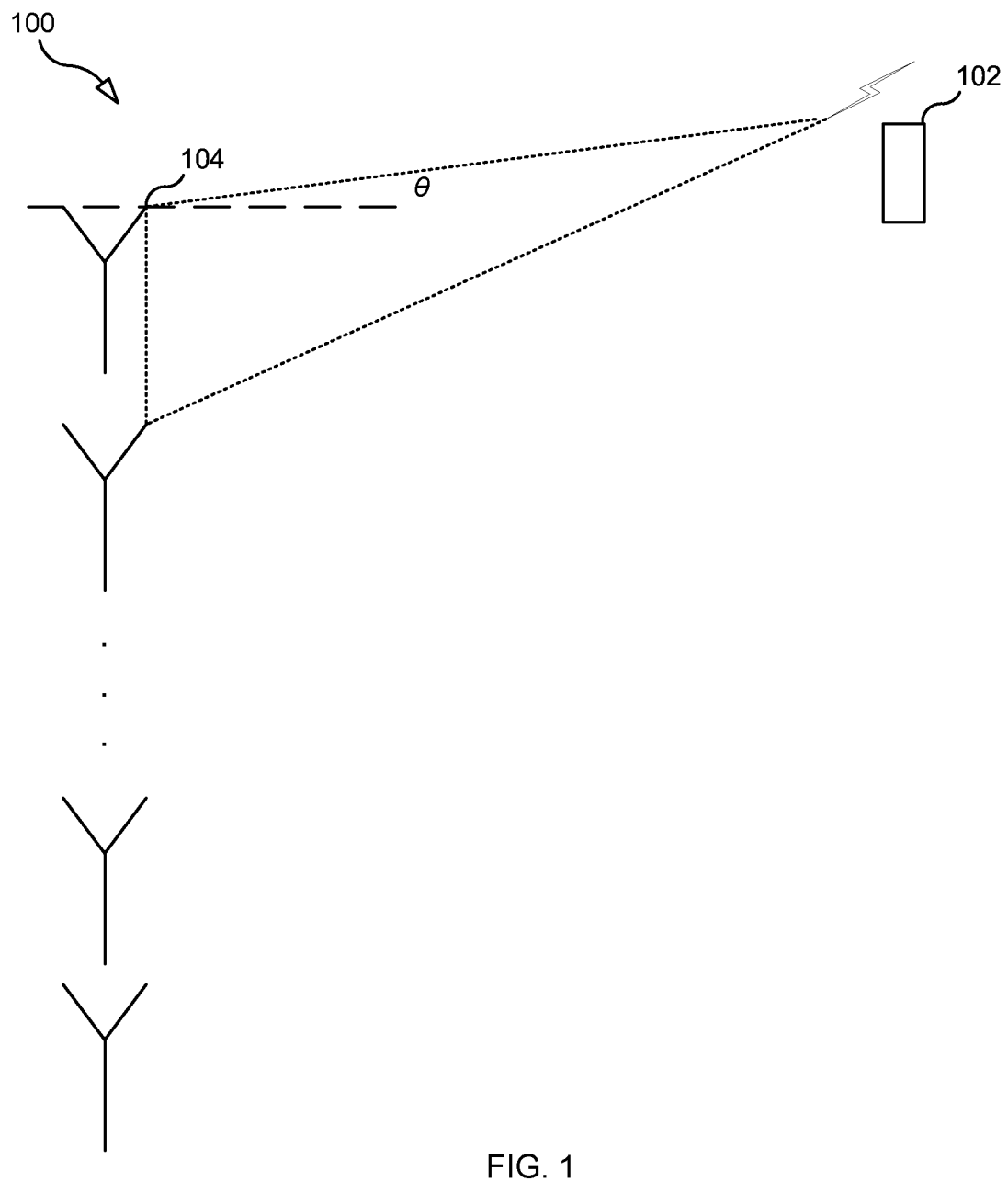
FIG. 1 illustrates shows an idealized, one-dimensional beamforming case.
Figure 2:
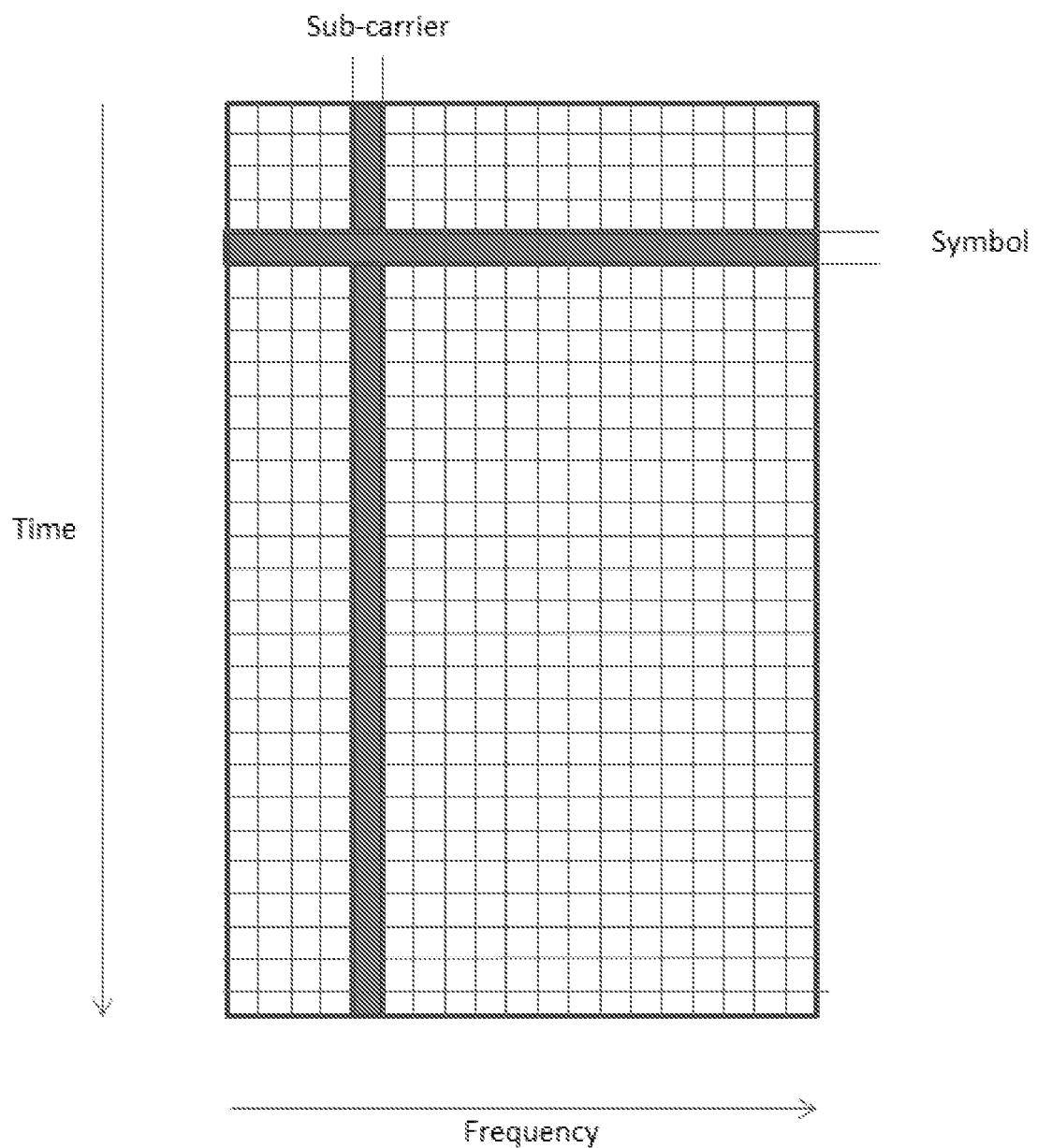
FIG. 2 illustrates a resource grid, divided in time and frequency.
Figure 3:
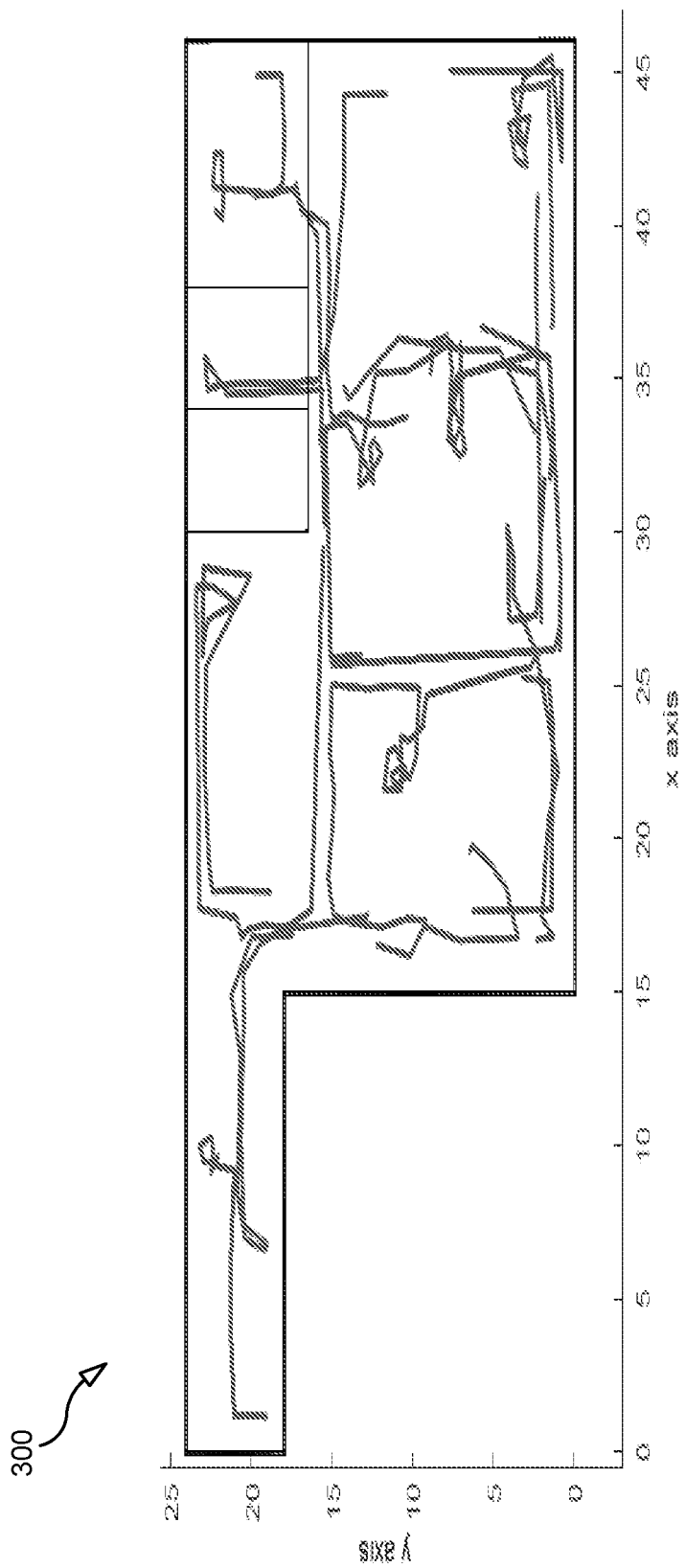
FIG. 3 illustrates a system according to some embodiments.

FIG. 3 illustrates an example geometry of an indoor cell, and also shows simulated trajectories of UEs within the cell, for system 300. The simulations are performed using an indoor scenario in which one base station is connected with several users. The carrier frequency is 28 GHz and it is assumed the users transmit with equal power in all directions. In the example simulation, the base station performs beam tracking for each user, processing (up to) ten beams at a given point in time. The beams are generated with an 8×8 planar array.

Still referring to FIG. 3, the UEs may move along a restricted set of trajectories where some UEs may share some part of the trajectory. In the simulations, the base station and the UEs are located at the same altitude, so the base station tracks a UE only along the azimuth angle. In embodiments, tracking may also occur along elevation, distance, or position of the UEs. There are no additional objects in the example map, thus shadowing only occurs in the example shown when a UE blocks the transmission path of another UE.

Building the first and second probability maps will now be described.

New users can turn up in a cell in a variety of ways. For example, the UE may be turned on within the cell; or UEs can turn up by entering the cells around a corner or by opening a door (e.g., for indoor cells). That is, some ways in which a UE may turn up in a cell may be close to random (e.g., where a UE is turned on), while other ways appear more regular based on the geometry of a given cell. A probability map can therefore be built up, in some embodiments, by introducing a grid where the initial angle of a first beam is added as an event to a histogram on the grid. For example, in some embodiments, each time a UE is detected, the initial angle may be added to a histogram (e.g., a bin may be kept for each angle, and the bin may store a count of each time a primary beam of a UE is detected at that angle). In other embodiments, the histogram may be updated at regular time intervals for each UE (e.g., the bin may store a count of UEs having a particular angle for their primary beam, either at the specific instance, or summed over a time period).

Referring to the geometry of FIG. 3, it can be expected that a histogram representing the first probability map will have a peak roughly at −15 degrees, since the base station is located at x=0, y=22 in this example. This angle (−15 degrees) represents the angle where users entering around the corner first get into line of sight of the base station. There may also be a background level to the histogram (e.g., noise), corresponding to users that turn on the UEs anywhere in the cell. The first probability map may be based on one or more of the azimuth and elevation, and the distance and positions of the UEs.

Figure 4:
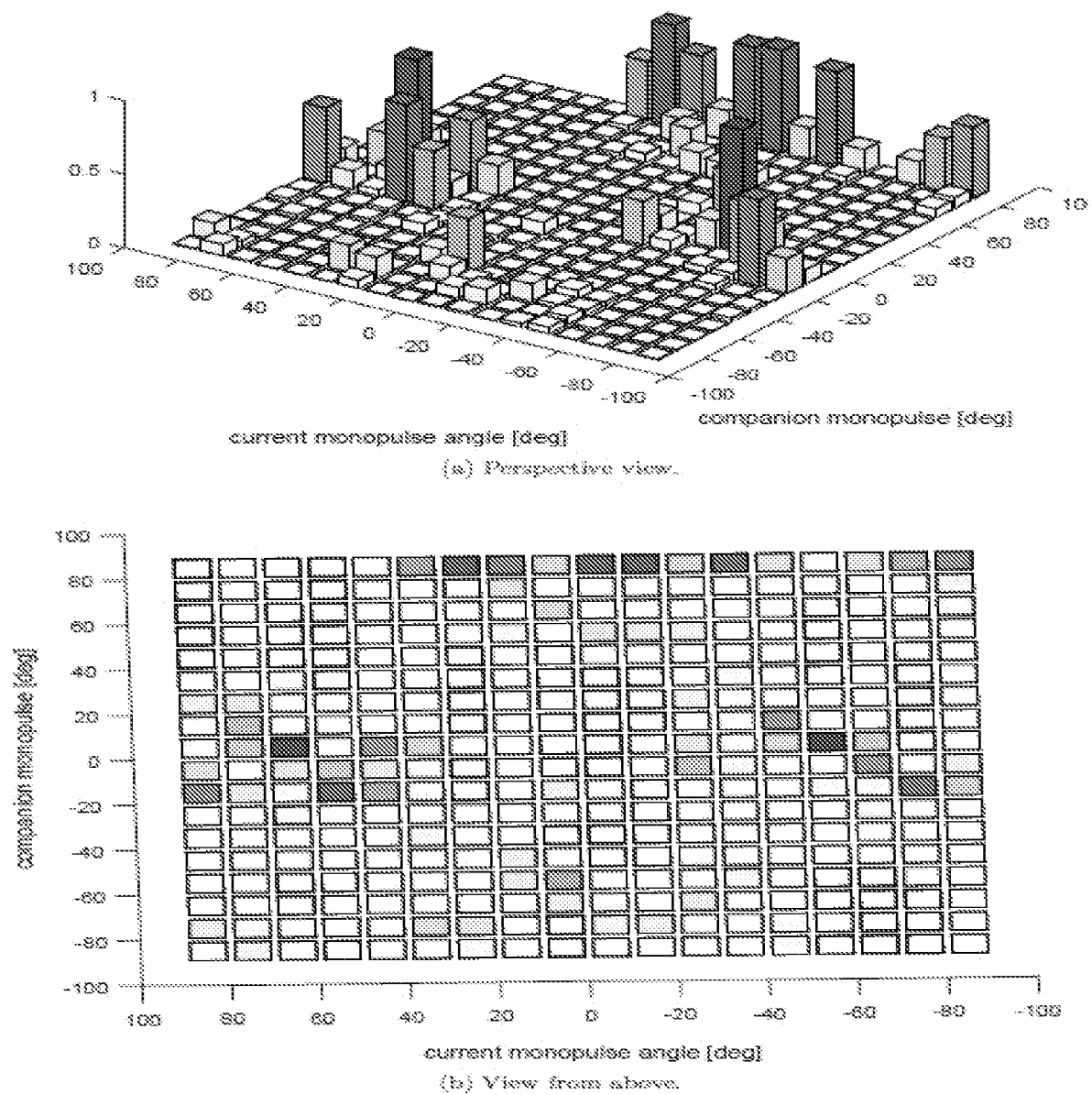
FIG. 4 illustrates a joint likelihood probability map according to some embodiments.

As discussed above, once a primary beam is found, it can often be useful to find secondary (a.k.a candidate) beams for a given UE (e.g., in case of sudden deterioration of the signal quality). In a simulation, it has been found that there is a relationship between primary and secondary beams (e.g., a relationship between the angles of primary and secondary beams). The simulation represented by FIG. 3, which tracked multiple beams for a UE simultaneously, was used to build up a second probability map, e.g., a two dimensional histogram that describes the joint likelihood of the azimuth directions of a primary and secondary beam. The obtained histogram is depicted in FIG. 4. Here, a bin may be kept for each azimuth angle for both the primary and secondary beam. Given e.g. the registered azimuth angles of a primary beam and a secondary beam of a UE, the corresponding bin of the histogram is increased by 1, at each selected time instance of a histogram update procedure. The second probability map may be based on one or more of the azimuth and elevation, and the distance and positions of the UEs. As was the case for the first probability map, the map (e.g., histogram) may be updated in a number of ways. For example, the histogram may be updated the first time a primary beam and secondary beams are discovered for a given UE, or the histogram may be updated at regular time intervals for each UE.

As shown in FIG. 4, where a primary beam direction is available (denoted current monopulse in FIG. 4), then the histogram shows that it is a good strategy to search for secondary (a.k.a. candidate) beams (denoted companion monopulse in FIG. 4) primarily in the directions where the values in the bins of the histogram are large. That is, either the scanning approach or the simultaneous search approach to beam discovery should prioritize directions where the conditional likelihood exceeds a threshold, i.e. where $p(\alpha_2 | \alpha_1) \geq th$ (in this example, $\alpha_2$ denotes the unknown secondary beam direction and $\alpha_1$ denotes the known primary beam direction). In embodiments, the scanning approach may prioritize directions based on the conditional likelihood by scanning directions in order of decreasing conditional likelihood.

The first and/or second probability maps (e.g., the histogram or parts thereof) can be broadcasted to UEs to enable those UEs to faster detect beams from a base station. The delay of a UE finding a base station can also be decreased by the UE having knowledge of its orientation or position or gain to a base station (e.g., based on sensors such as a gyroscope). For example, if a UE measures the gain to a base station it might use some broadcasted (or UE measured) histogram information to know where to search for beams.

The first and/or second probability maps (e.g., the histograms) may be built up and stored at a variety of locations.

One option is to build up such histograms in the base station (e.g., eNB, gNB) that serves the specific cell. Another option is to build up such histograms in a pooled processing environment (e.g., a cloud computing environment). For example, where parts of the base band (where the processing using the histograms may be performed) are removed from the base station and placed in such a pooled processing environment, the cloud may need to receive (and the base station or other network entity may need to signal) beam directions, or indices indicating beam directions. Such signaling may occur between the parts of the base band that resides in the base station and the parts that reside in the cloud. In such cases, pairs of angles, or corresponding indices, may be signaled from the base station to the cloud. The histograms built and managed in the cloud may be downloaded to the base station (e.g., by request from the base station, automatically pushed from the cloud). Yet another option is that the UEs build and saves the histogram, for use by the UE or for signaling to the network (e.g., the base station, other UEs).

The histogram could also be extended from the above description to provide pairs of azimuth and elevation angles. This may be useful in 5G wireless systems where the antenna arrays are expected to provide two dimensional (angular) beamforming.

As can be seen in FIG. 4, most bins (in this example) have quite small values and, conditioned on a given primary beam direction, there may be between 5-15% of the bins that have large values. This directly translates into a reduction of the scanning latency with a factor of between 7-20. This is an extremely significant system gain, since the main impairment of scanning is considered to be the latency.

As for detection thresholds, the number of bins to search are correspondingly reduced. To quantify a gain, consider the probability of false alarm threshold with power detection. A false alarm corresponds to detection of a signal when there is only noise present; and assuming complex signals and a chi-squared distribution, this gives $$P_{fa} = 1 - (1 - e^{-1/2SNR})^N.$$

Figure 5:
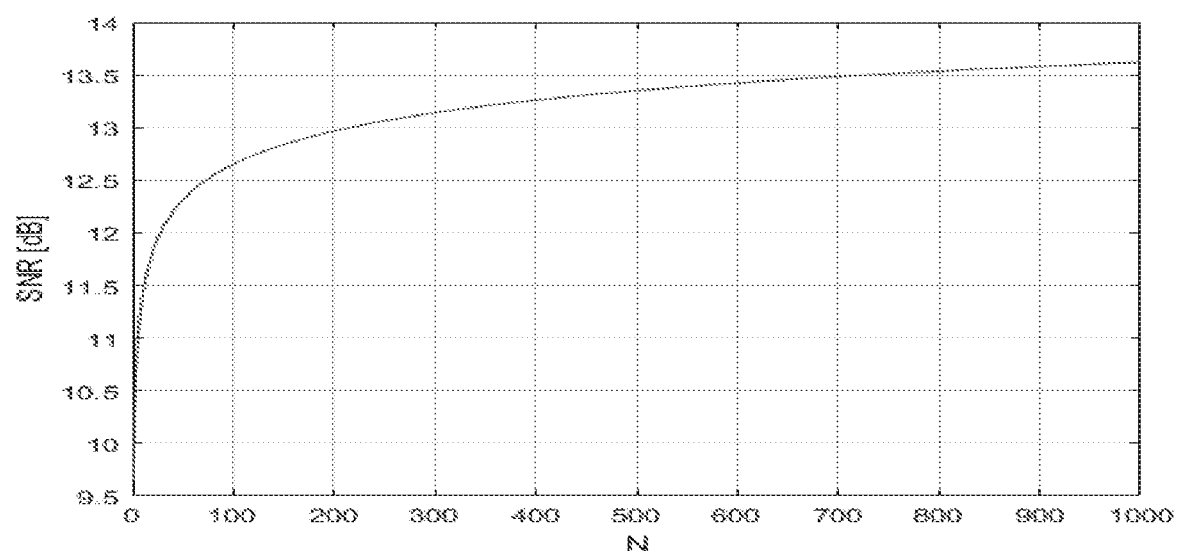
FIG. 5 illustrates a graph of a false alarm detection threshold as a function of the dimension of a search space according to some embodiments.

Here $P_{fa}$ denotes the false alarm probability, SNR is the signal to noise ratio, and N is the number of bins to search. Computing the SNR for $P_{fa}=0.01$ results in graph in FIG. 5. This graph shows the threshold in terms of SNR. Depending on the number of bins to search, the threshold reduction can reach 1.5 dB for a reduction of the search space of a factor of 10.

Figure 6:
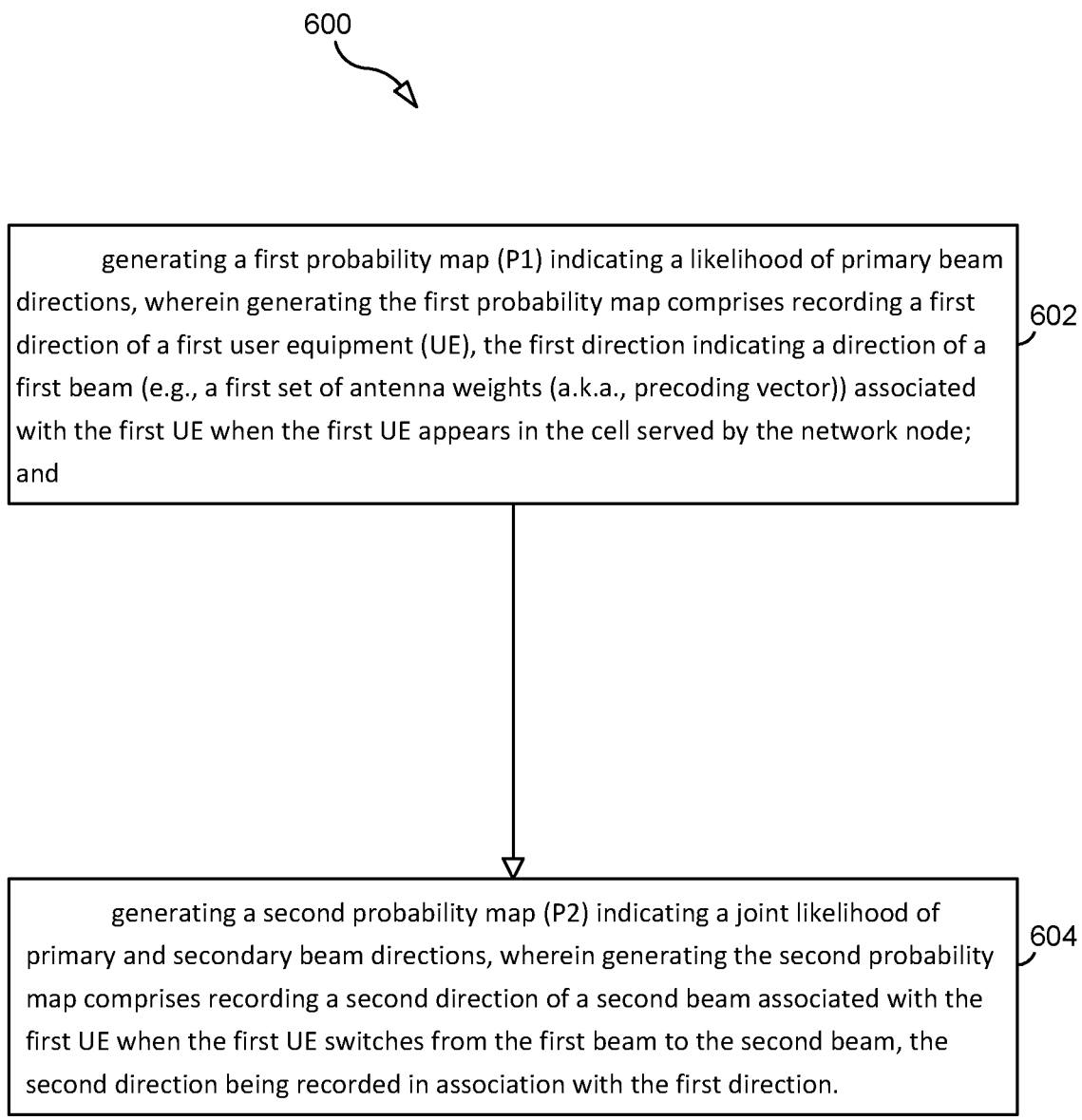
FIG. 6 illustrates a flow chart according to some embodiments.

FIG. 6 illustrates a flow chart according to some embodiments.

Process 600 is a method for generating a probability map for a cell served by a network node. The method includes generating a first probability map (P1) indicating a likelihood of primary beam directions (step 602). Generating the first probability map includes recording a first direction of a first user equipment (UE), the first direction indicating a direction of a first beam (e.g., a first set of antenna weights (a.k.a., precoding vector)) associated with the first UE when the first UE appears in the cell served by the network node. The method further includes generating a second probability map (P2) indicating a joint likelihood of primary and secondary beam directions (step 604). Generating the second probability map includes recording a second direction of a second beam associated with the first UE when the first UE switches from the first beam to the second beam, the second direction being recorded in association with the first direction.

In some embodiments, the method further includes receiving a first indication when a second UE appears in the cell served by the network node, the first indication including a third direction indicating a direction of a third beam associated with the second UE when the second UE appears in the cell served by the network node; and upon receiving the first indication, updating the first probability map. Updating the first probability map includes recording the third direction of the second UE. In embodiments, the method further includes receiving a second indication when the second UE switches from the third beam to a fourth beam, the second indication comprising a fourth direction indicating a direction of the fourth beam associated with the second UE; and upon receiving the second indication, updating the second probability map. Updating the second probability map includes recording the fourth direction of the second UE, the fourth direction being recorded in association with the third direction.

In some embodiments, receiving one or more of the first indication and the second indication includes tracking, by the network node, of the second UE in the cell served by the network node. In embodiments, receiving one or more of the first indication and the second indication comprises receiving, from the network node, information about the second UE in the cell served by the network node. In embodiments, the method further includes updating, periodically or event based, one or more of the first probability map and the second probability map, to include direction information about UEs located within the cell served by the network node. For example, periodic updates may occur based on a fixed time interval, and/or event based updates may occur as a result of specific events triggering an update. In embodiments, the method further includes transmitting one or more of the first probability map and the second probability map to the network node.

In some embodiments, the method further includes searching a beamspace to determine an initial beam (e.g., a first set of antenna weights (a.k.a., precoding vector)) for communication between a user equipment (UE) and the node. Searching the beamspace to determine the initial beam includes prioritizing directions (a1) within the beamspace based on the first probability map. In embodiments, the method further includes searching the beamspace to determine a backup beam (e.g., a second set of antenna weights (a.k.a., precoding vector)) for communication between the UE and the node. Searching the beamspace to determine the backup beam includes prioritizing directions ($\alpha_2$) within the beamspace based on the second probability map and the initial beam.

Figure 7:
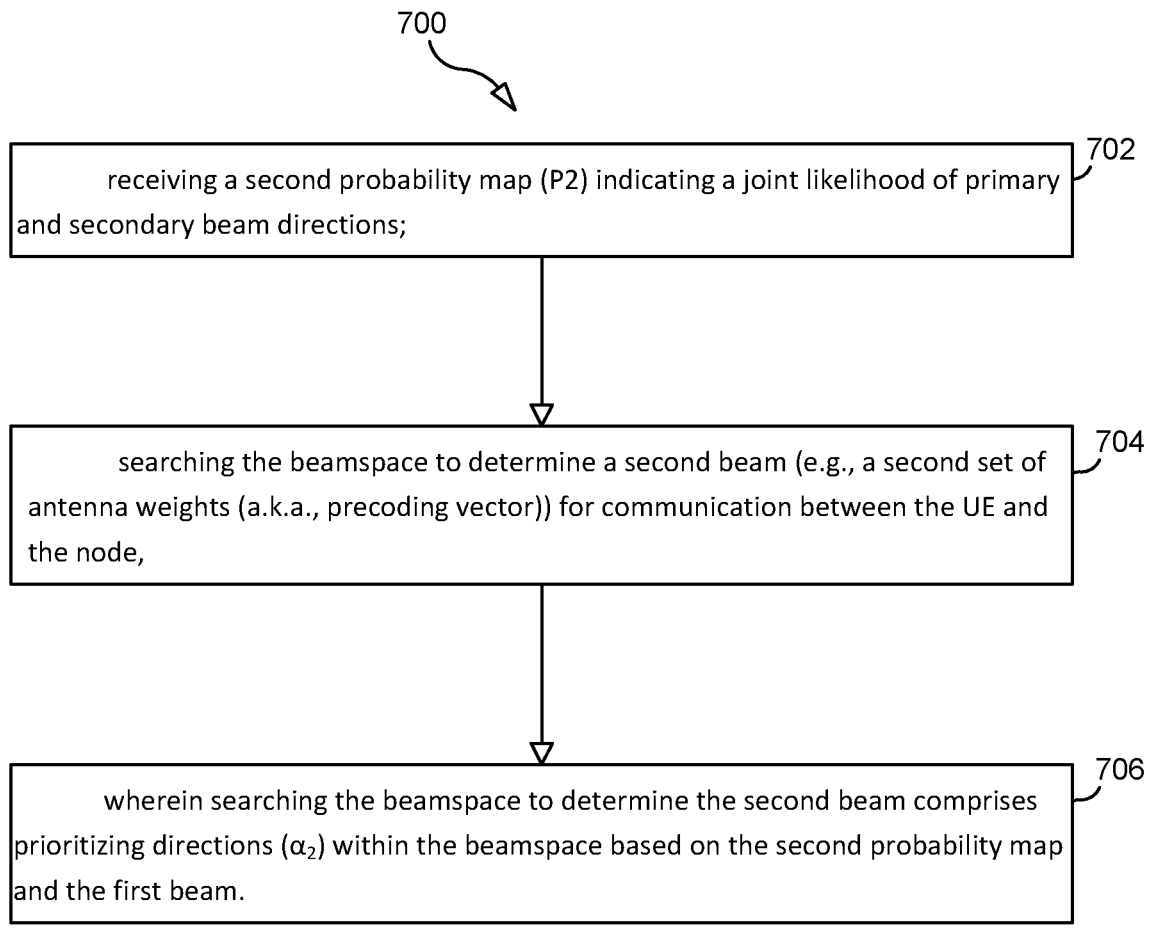
FIG. 7 illustrates a flow chart according to some embodiments.

FIG. 7 illustrates a flow chart according to some embodiments.

Process 700 is a method performed by a node in a network, the network node serving a cell, and/or method a performed by a user equipment (UE), the UE being in a cell served by a node in a network. The method includes receiving a first probability map (P1) indicating a likelihood of primary beam directions (step 702). The method further includes searching a beamspace to determine a first beam (e.g., a first set of antenna weights (a.k.a., precoding vector)) for communication between a user equipment (UE) and the node (step 704). Searching the beamspace to determine the first beam includes prioritizing directions ($\alpha_1$) within the beamspace based on the first probability map (step 706).

In some embodiments, the method further includes determining an orientation (e.g., of the UE with respect to the node). In embodiments, e.g. where a UE receives a probability map from another entity such as a base station, the orientation may be used to determine how angles or positions measured with respect to the base station are related to the UE. For example, a base station may determine that at an initial beam is most likely at an angle of approximately 15° (with respect to the base station), and the UE may then use knowledge of its orientation and knowledge of the base station, to determine a corresponding angle (with respect to the UE).

In some embodiments, searching the beamspace to determine the first beam further comprises searching only a first subset of the beamspace, the first subset comprising directions ($\alpha_1$) within the beamspace that exceed a first threshold ($th_1$) (e.g., $P1(\alpha_1) > th_1$). In embodiments, the method further includes receiving a second probability map (P2) indicating a joint likelihood of primary and secondary beam directions; and searching the beamspace to determine a second beam (e.g., a second set of antenna weights (a.k.a., precoding vector)) for communication between the UE and the node. Searching the beamspace to determine the second beam includes prioritizing directions ($\alpha_2$) within the beamspace based on the second probability map and the first beam. In embodiments, searching the beamspace to determine the second beam further comprises searching only a second subset of the beamspace, the second subset comprising directions ($\alpha_2$) within the beamspace that exceed a second threshold ($th_2$) (e.g., $P2(\alpha_2|\alpha_1) > th_2$). Note that, as used here and throughout, $\alpha_1$ and $\alpha_2$ may denote sets of angular directions, e.g., corresponding to bins in a histogram, rather than a single angle.

Figure 8:
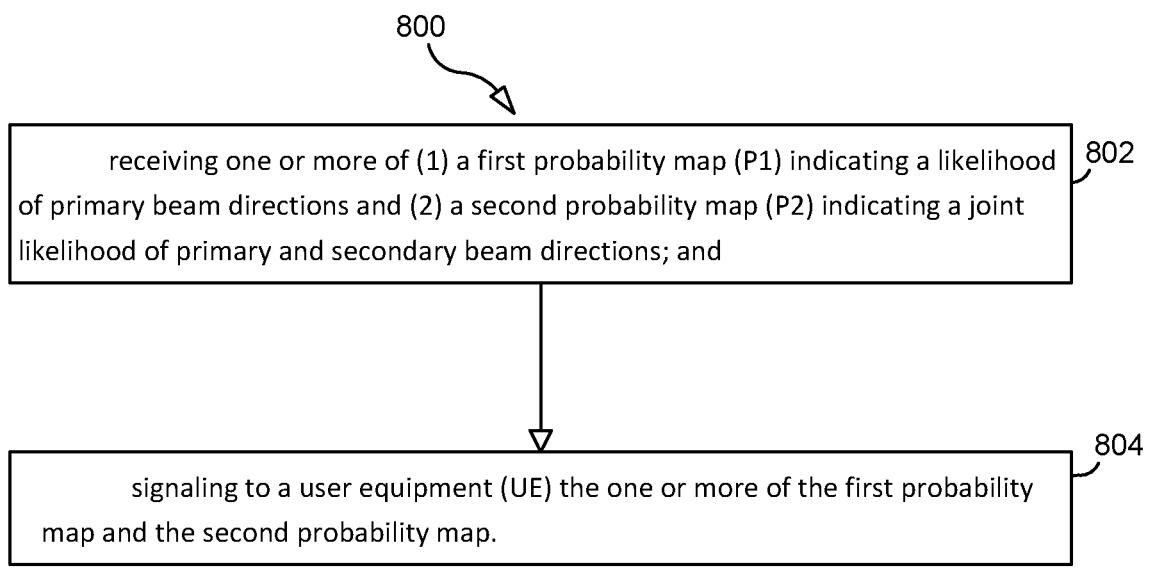
FIG. 8 illustrates a flow chart according to some embodiments.

FIG. 8 illustrates a flow chart according to some embodiments.

Process 800 is a method performed by a node in a network. The method includes receiving one or more of (1) a first probability map (P1) indicating a likelihood of primary beam directions and (2) a second probability map (P2) indicating a joint likelihood of primary and secondary beam directions (step 802). The method further includes signaling to a user equipment (UE) the one or more of the first probability map and the second probability map (step 804).

Figure 9:
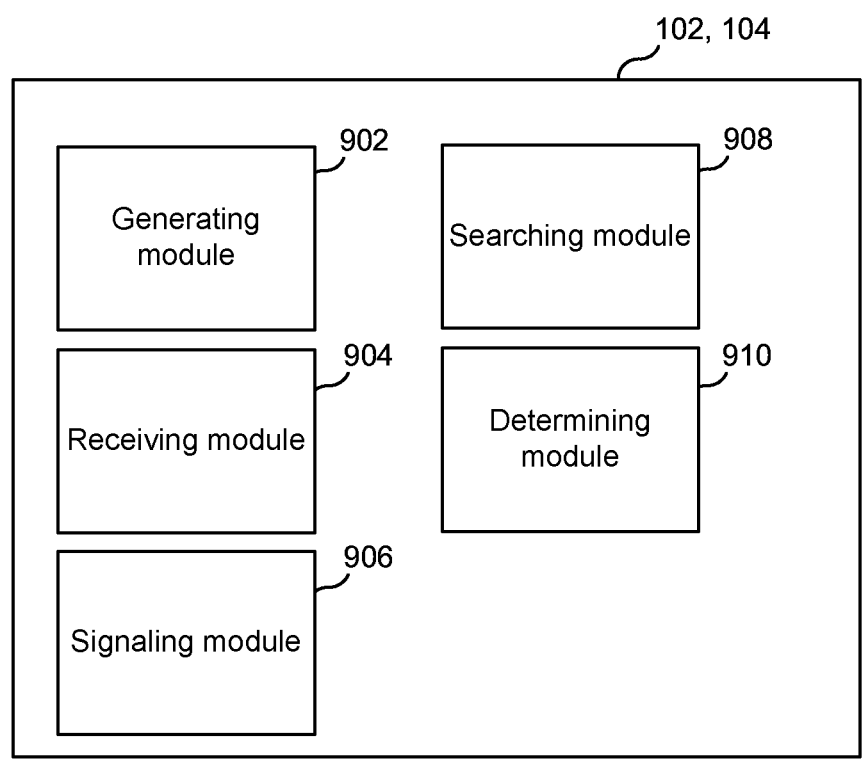
FIG. 9 is a diagram showing functional modules of a network node according to some embodiments.

FIG. 9 is a diagram showing functional modules of UE 102, node 104, and/or a pooled processing environment (e.g., a cloud processing environment), according to some embodiments. As shown in FIG. 9, UE 102, node 104, and/or a pooled processing environment (e.g., a cloud processing environment), includes a generating module 902, a receiving module 904, a signaling module 906, a searching module 908, and a determining module 910.

In embodiments, UE 102, node 104, and/or a pooled processing environment (e.g., a cloud processing environment), is configured for generating a probability map for a cell served by a network node. Generating module 902 is configured to generate a first probability map (P1) indicating a likelihood of primary beam directions. Generating the first probability map includes recording a first direction of a first user equipment (UE), the first direction indicating a direction of a first beam (e.g., a first set of antenna weights (a.k.a., precoding vector)) associated with the first UE when the first UE appears in the cell served by the network node. Generating module 902 is further configured to generate a second probability map (P2) indicating a joint likelihood of primary and secondary beam directions. Generating the second probability map includes recording a second direction of a second beam associated with the first UE when the first UE switches from the first beam to the second beam, the second direction being recorded in association with the first direction.

In embodiments, UE 102, node 104, and/or a pooled processing environment (e.g., a cloud processing environment), is configured for searching a beamspace. Receiving module 904 is configured to receive a first probability map (P1) indicating a likelihood of primary beam directions. This probability map may be a map generated by generating module 902, or it may be map transmitted by another entity (such as another UE, node, and/or pooled processing environment). Determining module 910 is configured to determine an orientation (e.g., of the UE 102, node 104, and/or pooled processing environment). Searching module 906 is configured to search a beamspace to determine a first beam (e.g., a first set of antenna weights (a.k.a., precoding vector)) for communication between a user equipment (UE) and the node. Searching the beamspace to determine the first beam includes prioritizing directions ($\alpha_1$) within the beamspace based on the first probability map.

In embodiments, UE 102, node 104, and/or a pooled processing environment (e.g., a cloud processing environment), is configured for signaling a probability map. Receiving module 904 is configured to receive one or more of (1) a first probability map (P1) indicating a likelihood of primary beam directions and (2) a second probability map (P2) indicating a joint likelihood of primary and secondary beam directions. This probability map (or maps) (P1, P2) may be a map generated by generating module 902, or it may be map transmitted by another entity (such as another UE, node, and/or pooled processing environment). Signaling module 906 is configured to signal to a user equipment (UE) the one or more of the first probability map and the second probability map.

Figure 10:
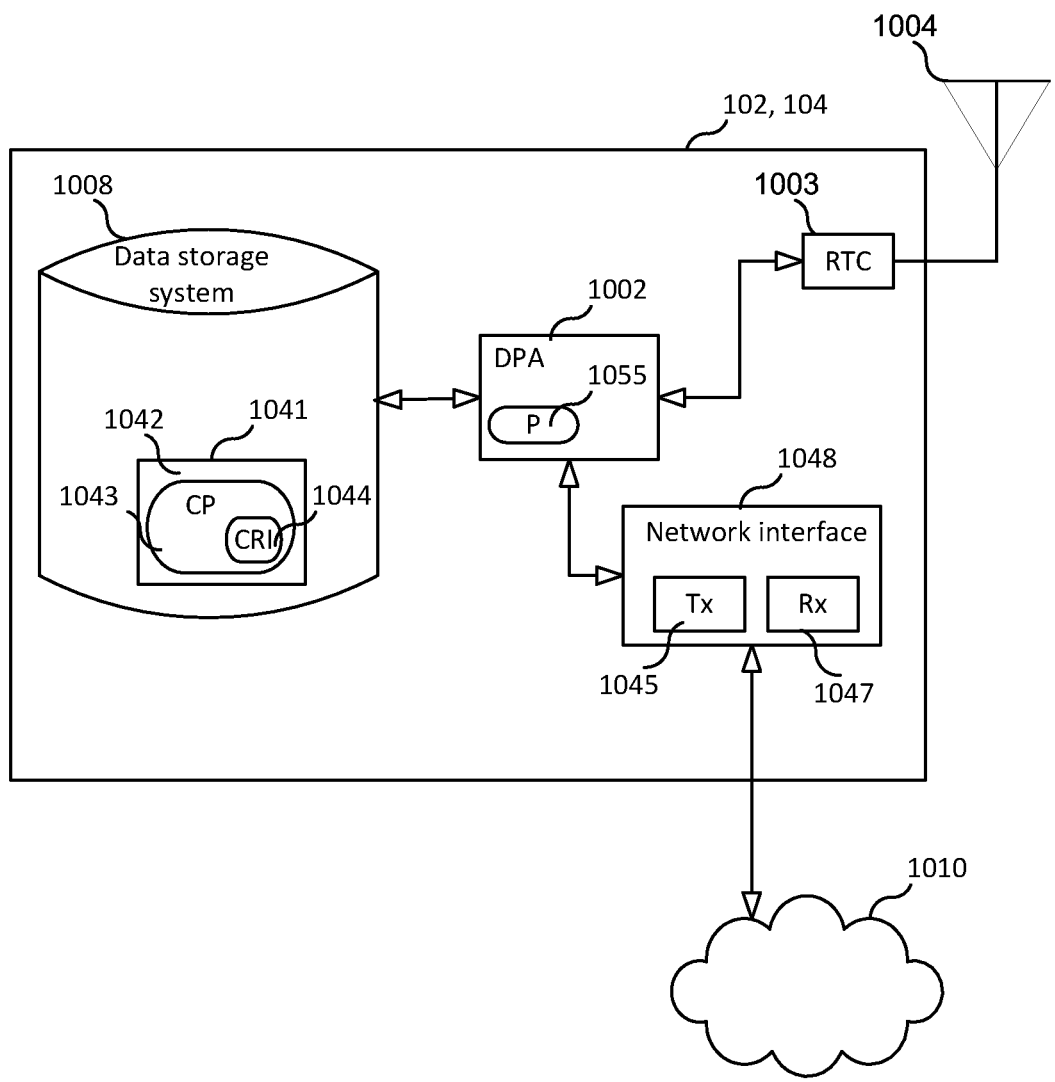
FIG. 10 is a block diagram of a network node according to some embodiments.

FIG. 10 is a block diagram of UE 102, node 104, and/or a pooled processing environment (e.g., a cloud processing environment), according to some embodiments. As shown in FIG. 9, UE 102, node 104, and/or a pooled processing environment (e.g., a cloud processing environment), may comprise: a data processing apparatus (DPA) 1002, which may include one or more processors (P) 1055 (e.g., a general purpose microprocessor and/or one or more other processors, such as an application specific integrated circuit (ASIC), field-programmable gate arrays (FPGAs), and the like); a network interface 1048 comprising a transmitter (Tx) 1045 and a receiver (Rx) 1047 for enabling UE 102, node 104, and/or a pooled processing environment (e.g., a cloud processing environment), to transmit data to and receive data from other nodes connected to a network 1010 (e.g., an Internet Protocol (IP) network) to which network interface 1048 is connected; circuitry 1003 (e.g., radio transceiver circuitry) coupled to an antenna system 1004 for wireless communication with UEs); and local storage unit (a.k.a., "data storage system") 1008, which may include one or more non-volatile storage devices and/or one or more volatile storage devices (e.g., random access memory (RAM)). In embodiments where UE 102, node 104, and/or a pooled processing environment (e.g., a cloud processing environment), includes a general purpose microprocessor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, but not limited to, magnetic media (e.g., a hard disk), optical media, memory devices (e.g., random access memory, flash memory), and the like. In some embodiments, the CRI 1044 of computer program 1043 is configured such that when executed by data processing apparatus 1002, the CRI causes UE 102, node 104, and/or a pooled processing environment (e.g., a cloud processing environment), to perform steps described above (e.g., steps described above with reference to the flow charts). In other embodiments, UE 102, node 104, and/or a pooled processing environment (e.g., a cloud processing environment), may be configured to perform steps described herein without the need for code. That is, for example, data processing apparatus 1002 may consist merely of one or more ASICs. Hence, the features of the embodiments described herein may be implemented in hardware and/or software.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for generating a probability map for a cell served by a network node, the method comprising:
generating a first probability map indicating a likelihood of primary beam directions, wherein generating the first probability map comprises recording a first direction of a first user equipment (UE), the first direction indicating a direction of a first beam associated with the first UE when the first UE appears in the cell served by the network node;
generating a second probability map indicating a joint likelihood of primary and secondary beam directions, wherein generating the second probability map comprises recording a second direction of a second beam associated with the first UE when the first UE switches from the first beam to the second beam, the second direction being recorded in association with the first direction;
receiving a first indication when a second UE appears in the cell served by the network node, the first indication comprising a third direction indicating a direction of a third beam associated with the second UE when the second UE appears in the cell served by the network node; and
after receiving the first indication, updating the first probability map, wherein updating the first probability map comprises recording the third direction of the second UE.

2. The method of claim 1, further comprising:
receiving a second indication when the second UE switches from the third beam to a fourth beam, the second indication comprising a fourth direction indicating a direction of the fourth beam associated with the second UE; and
upon receiving the second indication, updating the second probability map, wherein updating the second probability map comprises recording the fourth direction of the second UE, the fourth direction being recorded in association with the third direction.

3. The method of claim 1, wherein receiving the first indication comprises tracking, by the network node, of the second UE in the cell served by the network node.

4. The method of claim 1, wherein receiving the first indication comprises receiving, from the network node, information about the second UE in the cell served by the network node.

5. The method of claim 1, further comprising updating, periodically or event based, one or more of the first probability map and the second probability map, to include direction information about UEs located within the cell served by the network node.

6. The method of claim 1, further comprising transmitting one or more of the first probability map and the second probability map to the network node.

7. The method of claim 1, further comprising:
searching a beamspace to determine an initial beam for communication between a user equipment, UE, and the node,
wherein searching the beamspace to determine the initial beam comprises prioritizing directions within the beamspace based on the first probability map.

8. The method of claim 7, further comprising:
searching the beamspace to determine a backup beam for communication between the UE and the node,
wherein searching the beamspace to determine the backup beam comprises prioritizing directions within the beamspace based on the second probability map and the initial beam.

9. A computer program product comprising a non-transitory computer readable medium storing computer program comprising instructions which, when executed on at least one processor, causes the at least one processor to carry out the method of claim 1.

10. A method comprising:
obtaining a first probability map, wherein i) the first probability map comprises a set of primary beam direction identifiers, where each one of the primary beam direction identifiers identifies a primary beam direction, and ii) the first probability map further comprises, for each beam direction identifier included in the set of primary beam direction identifiers, a likelihood value indicating a likelihood for the beam direction identified by the beam direction identifier; and
searching a beamspace to determine a first beam for communication between a user equipment (UE) and a node in a network, wherein
searching the beamspace to determine the first beam comprises prioritizing directions within the beamspace based on the first probability map.

11. The method of claim 10, wherein searching the beamspace to determine the first beam further comprises searching only a first subset of the beamspace, the first subset comprising directions within the beamspace that exceed a first threshold.

12. The method of claim 10, further comprising:
receiving a second probability map indicating a joint likelihood of primary and secondary beam directions;
searching the beamspace to determine a second beam for communication between the UE and the node,
wherein searching the beamspace to determine the second beam comprises prioritizing directions within the beamspace based on the second probability map and the first beam.

13. The method of claim 12, wherein searching the beamspace to determine the second beam further comprises searching only a second subset of the beamspace, the second subset comprising directions within the beamspace that exceed a second threshold.

14. The method of claim 10, further comprising determining an orientation of the UE with respect to the node.

15. A computer program product comprising a non-transitory computer readable medium storing computer program comprising instructions which, when executed on at least one processor, causes the at least one processor to carry out the method of claim 10.

16. A method performed by a node in a network, the method comprising:
obtaining a first probability map, wherein i) the first probability map comprises a set of primary beam direction identifiers, where each one of the primary beam direction identifiers identifies a primary beam direction, and ii) the first probability map further comprises, for each beam direction identifier included in the set of primary beam direction identifiers, a likelihood value indicating a likelihood for the beam direction identified by the beam direction identifier; and
signaling to a user equipment, UE, the first probability map.

17. A device for generating a probability map for a cell served by a network node, the device being adapted to:
generate a first probability map indicating a likelihood of primary beam directions, wherein generating the first probability map comprises recording a first direction of a first user equipment (UE), the first direction indicating a direction of a first beam associated with the first UE when the first UE appears in the cell served by the network node; and
generate a second probability map indicating a joint likelihood of primary and secondary beam directions, wherein generating the second probability map comprises recording a second direction of a second beam associated with the first UE when the first UE switches from the first beam to the second beam, the second direction being recorded in association with the first direction; and
update the first probability map after receiving a first indication comprising a third direction indicating a direction of a third beam associated with a second UE when the second UE appears in the cell served by the network node, wherein updating the first probability map comprises recording the third direction of the second UE.

18. A device being adapted to:
obtain a first probability map, wherein i) the first probability map comprises a set of primary beam direction identifiers, where each one of the primary beam direction identifiers identifies a primary beam direction, and ii) the first probability map further comprises, for each beam direction identifier included in the set of primary beam direction identifiers, a likelihood value indicating a likelihood for the beam direction identified by the beam direction identifier; and
search a beamspace to determine a first beam for communication between a user equipment and a node in a network, wherein
searching the beamspace to determine the first beam comprises prioritizing directions within the beamspace based on the first probability map.

19. A device being adapted to:
obtain a first probability map, wherein i) the first probability map comprises a set of primary beam direction identifiers, where each one of the primary beam direction identifiers identifies a primary beam direction, and ii) the first probability map further comprises, for each beam direction identifier included in the set of primary beam direction identifiers, a likelihood value indicating a likelihood for the beam direction identified by the beam direction identifier; and
signal to a user equipment, UE, the first probability map.

* * * * *